Dec. 12, 1939.  W. H. TOMME  2,183,176
ATTACHMENT FOR CRATES
Filed April 6, 1938   2 Sheets-Sheet 1

Inventor
William H. Tomme,

By Clarence A. O'Brien
and Hyman Berman
Attorneys

Dec. 12, 1939.  W. H. TOMME  2,183,176
ATTACHMENT FOR CRATES
Filed April 6, 1938  2 Sheets-Sheet 2

Inventor
William H. Tomme,

By Clarence A. O'Brien
and Hyman Berman
Attorneys

Patented Dec. 12, 1939

2,183,176

UNITED STATES PATENT OFFICE 2,183,176

ATTACHMENT FOR CRATES

William H. Tomme, Donna, Tex.

Application April 6, 1938, Serial No. 200,511

3 Claims. (Cl. 217—3)

This invention relates to crates, particularly to crates of the type used in packing fruit.

An important object of the present invention is to provide for the prevention of injury to fruit during the crating thereof and particularly during the application of the lid to the crate.

To that end the invention consists in the provision of an attachment adapted to be applied to the center partition of the crate, and which is of such a construction that when applied it will positively preclude the fruit from becoming damaged as often results from the fruit being pressed between the slats of the lid and the upper edge of the center partition.

Further the invention comprehends the provision of a member which may be quickly and readily applied to the upper edge portion of the center partition, and which when applied will prevent the fruit from crowding onto the upper edge of the partition and thereby preclude injury to the fruit as often results because of this crowding and consequent compressing of the fruit between the upper edge of the center partition and the lid.

The invention together with its objects and advantages will be best understood from a study of the following description taken in connection with the accompanying drawings wherein—

Figure 1:
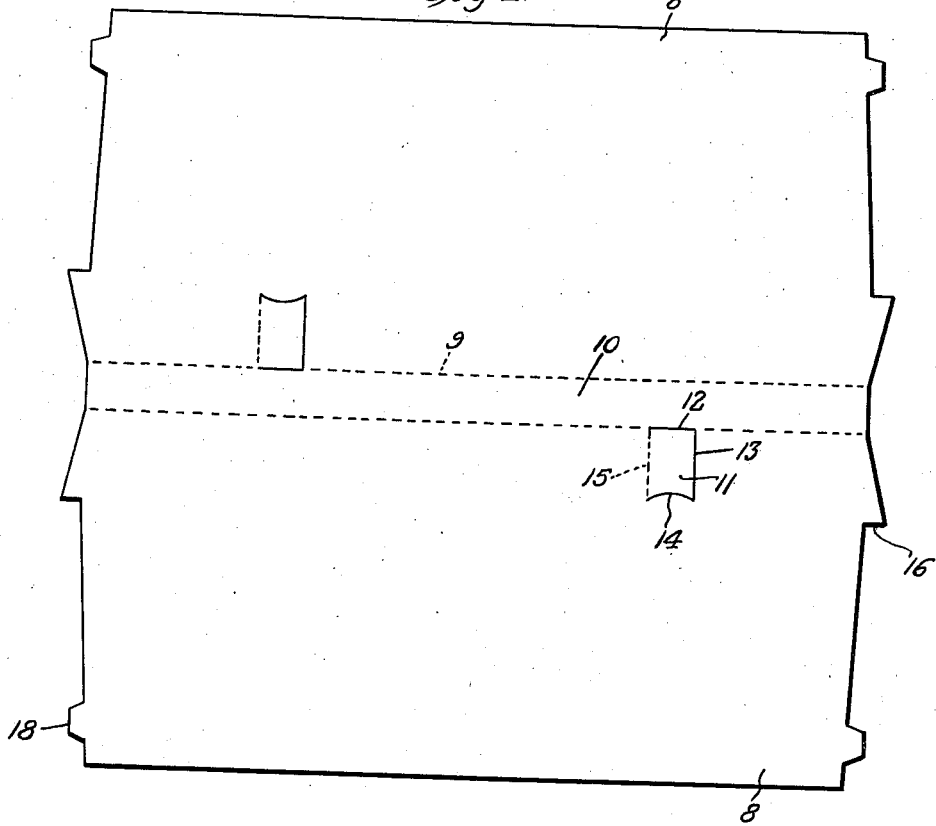
Figure 1 is a plan view of the attachment.
Figure 2:
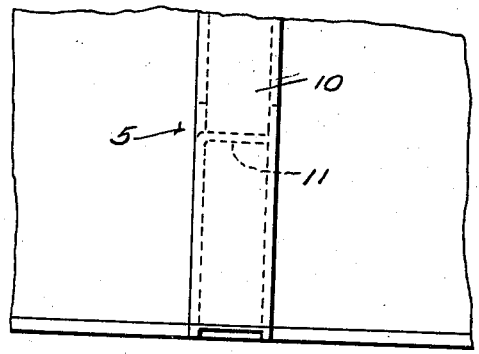
Figure 2 is a fragmentary top plan view showing the attachment applied.

Referring to the drawings by reference numerals it will be seen that the attachment is in the form of a substantially U-shaped member 5 that is adapted to straddle the center partition 6 of a conventional fruit crate 7.

The attachment 5 is cut from a single blank of cardboard or other suitable material cut, shaped and dimensioned to provide a substantially U-shaped member having sides 8 bent in parallelism on fold lines 9 to provide a connecting web 10 between the upper edges of the sides 8.

The sides 8 adjacent the upper edges thereof have areas 11 defined by slits 12, 13 and 14 and fold lines 15 which are adapted to be folded inwardly relative to the sides 8 and into bridging position between the sides 8 to form reinforcements for the device that prevent lateral collapsing of the device at the upper end thereof.

Figure 3:
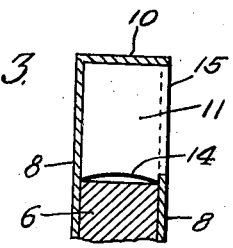
Figure 3 is a fragmentary detail sectional view of the attachment as applied.
Figure 4:
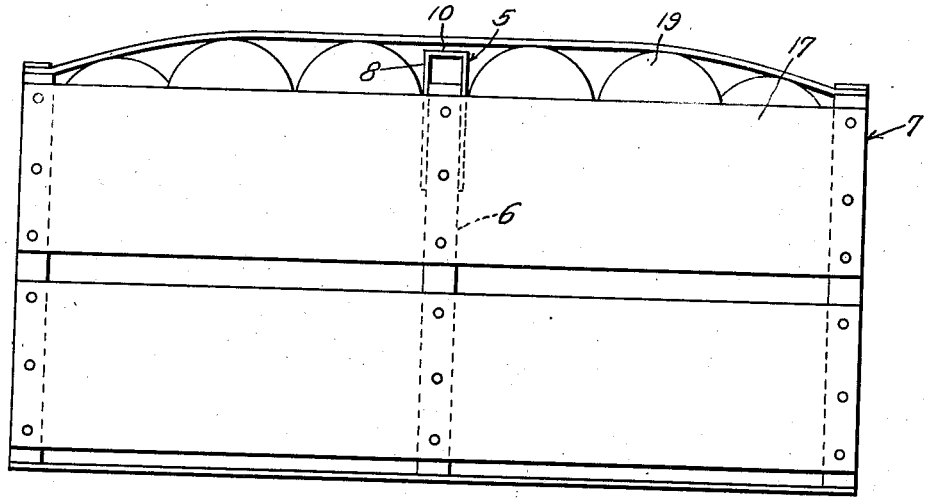
Figure 4 is a side elevational view of a lidded crate having the attachment applied thereto.

As shown in Figure 3 the reinforcing members 11 when folded inwardly into substantial parallelism contact the web 10 and opposite sides 8 of the member and substantially rest on the upper edge of the center partition 6.

Figure 5:
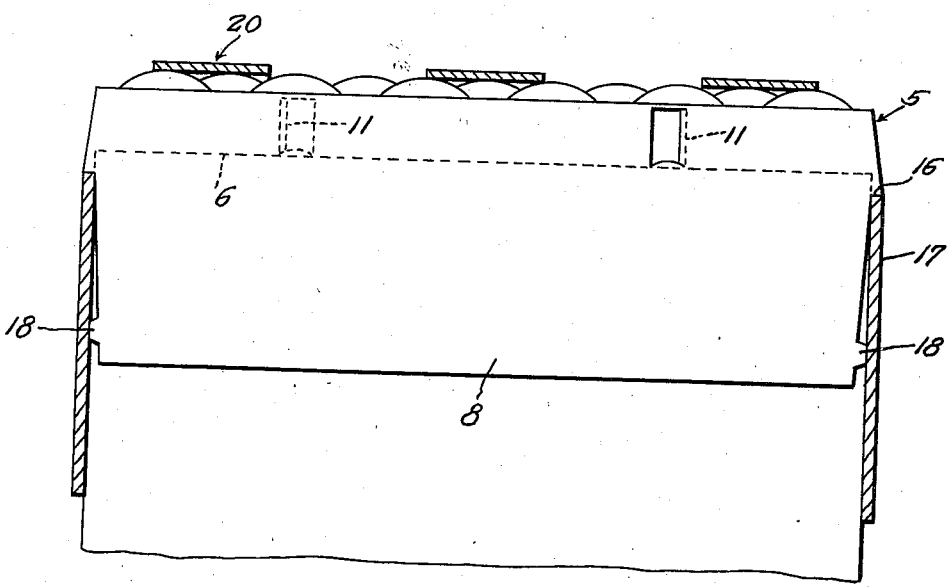
Figure 5 is a transverse sectional view through the crate further illustrating the application of the invention.
Figure 6:
Figure 6 is a fragmentary detail sectional view through the attachment.

At the respective opposite ends of the device the blank is cut to provide for the sides 8, shoulders 16 that rest on the upper edges of the side walls 17 of the crate as clearly shown in Figure 5 for limiting downward or inward movement of the device relative to the crate.

Also at the opposite end edges thereof the sides 8 are cut on a bias so as to facilitate the placing of the attachment. Adjacent the lower edge thereof the sides 8 have tongues 18 projecting therefrom that abut the inner faces of the side walls 17 of the crate as also shown in Figure 5, and having frictional contact with said walls 17 in a manner to retain the attachment firmly in position on the crate.

It will thus be seen that when in final position on the partition 6 the upper closed end of the attachment 5 extends upwardly beyond the upper edge of the partition and thus prevents the fruit 19 from contacting the upper edge of the partition.

Consequently through the medium of the attachment 5 the fruit 19 is maintained at opposite sides of the partition so that there is little or no danger of the fruit being pressed between the upper edge of the partition and the slats of the cover or lid 20 of the crate as the latter is being nailed or otherwise secured in position on the crate.

It is thought that a clear understanding of the construction, utility, manner of use and advantages of an invention of this character will be had without a more detailed description.

Having thus described the invention what is claimed as new is:

1. An attachment for application to the center partition of a fruit crate, said attachment comprising a substantially U-shaped member adapted to straddle the partition, a member extending across the upper portion of the space between the legs of the U-shaped member for engaging the partition for holding the bight of the U-shaped member in spaced relation above the upper edge of the partition, shoulders on the ends of the legs of the U-shaped member and located an appreciable distance from the upper end of the U-shaped member, for engaging the upper edges of the sides of the crate, said ends of the legs sloping downwardly and inwardly from said shoulders to space said portions at the ends of the legs from the sides of the crate and projections on the sloping portions, adjacent the lower edges of the legs for frictionally engaging the inner faces of the sides of the crate to hold the U-shaped member in position.

2. A device for attachment to the center partition of a fruit crate for protecting the contents of the crate from being crushed between the upper edge of the partition of the crate and the lid of the crate, said attachment being formed from a single blank of material and comprising a substantially rectangular body foldable on a pair of parallel fold lines to provide a substantially U-shaped member adapted to straddle the center partition of the crate, and the sides of said U-shaped member having areas defined by slits and fold lines adapted to be pressed inwardly relative to the sides of the member to extend between said sides to prevent lateral collapsing of said member and to engage the upper edge of the partition of a crate for supporting the member on the partition with the upper portion of the member projecting beyond the upper edge of the partition, and said body at opposite end edges thereof and at opposite sides of the fold lines being formed to provide for the sides of the member shoulders adapted to seat against the upper edges of the sides of a crate when the member is positioned on the partition, said end edges having downwardly and inwardly sloping walls, starting at the shoulders and projections on said sloping walls for frictionally engaging the inner faces of the sides of a crate for holding the attachment in position.

3. A device for engagement to the center partition of a crate for protecting the contents of the crate from being crushed between the upper edge of the partition and the lid of the crate comprising an inverted U-shaped member adapted to straddle the partition, shoulders on the ends of the legs of the member for engaging the upper edges of the sides of the crate, said shoulders being spaced such a distance from the upper edge of the member as to support the member in the crate with its top portion spaced an appreciable distance from the upper edge of the partition and projecting tabs on the ends of the legs adjacent the lower edges of the legs for frictionally engaging the inner faces of the sides of the crate to hold the member in position said tabs being located an appreciable distance below the shoulders.

WILLIAM H. TOMME.